United States Patent [19]
Wick et al.

[11] Patent Number: 5,056,052
[45] Date of Patent: Oct. 8, 1991

[54] FILTER ARRANGEMENT FOR GENERATING AN ESTIMATE OF A MEASURED VARIABLE INFLUENCED BY DISTURBANCES

[76] Inventors: Detlev Wick, Elbgaustrasse 178, 2000 Hamburg 53; Hans J. Senn, Wallstr. 3, 7860 Schopjheim, both of Fed. Rep. of Germany

[21] Appl. No.: 424,533

[22] Filed: Oct. 20, 1989

[30] Foreign Application Priority Data

Oct. 26, 1988 [DE] Fed. Rep. of Germany ....... 3836417

[51] Int. Cl.$^5$ ..................... H03H 17/00; G01C 21/00; G01B 21/24
[52] U.S. Cl. .................................. 364/572; 364/454; 364/551.01
[58] Field of Search ............... 364/443, 447, 453, 454, 364/550, 459, 551.01, 554, 571.05, 572, 724.19, 724.2

[56] References Cited

U.S. PATENT DOCUMENTS

| | | | |
|---|---|---|---|
| 3,889,108 | 6/1975 | Cantrell | 364/724.19 |
| 4,314,343 | 2/1982 | Tomlinson | 364/572 |
| 4,347,730 | 9/1982 | Fisher et al. | 364/571.05 |
| 4,664,052 | 5/1987 | Burns et al. | 364/447 |
| 4,791,573 | 12/1988 | Zemany et al. | 364/459 X |
| 4,817,026 | 3/1989 | Inoue et al. | 364/572 |

FOREIGN PATENT DOCUMENTS

| | | |
|---|---|---|
| 1941809 | 2/1971 | Fed. Rep. of Germany . |
| 2229431 | 1/1974 | Fed. Rep. of Germany . |
| 2545026A1 | 4/1977 | Fed. Rep. of Germany . |
| 2618868A1 | 11/1977 | Fed. Rep. of Germany . |
| 3119045A1 | 12/1982 | Fed. Rep. of Germany . |
| 3131110C1 | 2/1983 | Fed. Rep. of Germany . |
| 3146374A1 | 5/1983 | Fed. Rep. of Germany . |
| 3323648A1 | 1/1984 | Fed. Rep. of Germany . |
| 3229819A1 | 2/1984 | Fed. Rep. of Germany . |
| 3131111C2 | 5/1984 | Fed. Rep. of Germany . |
| 2922414C2 | 2/1985 | Fed. Rep. of Germany . |
| 3721186A1 | 1/1988 | Fed. Rep. of Germany . |
| 3701583A1 | 8/1988 | Fed. Rep. of Germany . |

OTHER PUBLICATIONS

Paper by H. Sorg entitled: Symposium Gyro Technology, 1984, Deutsche Gesellschaft fur Ortung und Navigation (DGON), Universitat Stuttgart, Insttit A fur Mechanik 1984, S. 19.0–19.23.

*Primary Examiner*—Parshotam S. Lall
*Assistant Examiner*—Edward Pipala
*Attorney, Agent, or Firm*—Lee, Mann, Smith, McWilliams & Sweeney

[57] ABSTRACT

A filter arrangement for generating an estimate of a measured variable influenced by disturbances, by means of a filter effecting a weighting of measuring signals characterized by means (50) for achieving a measure of the disturbance and means (52) for changing the weighting of the measuring signal in dependence on the measure of the disturbance. In this way, values of the measured variable which appear during the occurrence of the disturbance are not considered with the filtering or are considered with less weighting. In a tape-suspended restrained meridian gyro a characteristic oscillation of the system serves as the measure for the disturbance.

10 Claims, 6 Drawing Sheets

5,056,052

FILTER ARRANGEMENT FOR GENERATING AN ESTIMATE OF A MEASURED VARIABLE INFLUENCED BY DISTURBANCES

TECHNICAL FIELD

The invention relates to a filter arrangement for generating an estimate of a measured variable influenced by disturbances by means of a filter effecting a weighting of measuring signals.

BACKGROUND ART

From DE-OS 1 941 808 and DE-OS 1 941 809 a tape-suspended meridian gyro is known wherein the excursion of the gyro from a tape zero position is detected by a pick-off and is converted into an electrical signal. This signal is supplied through an amplifier to a torquer which acts about the tape axis. The torquer acts on the gyro and compensates for the "gyro directional torque" which acts about the tape axis on the gyro and endeavors to align the spin axis with north. The energizing current of the torquer is proportional to the gyro controlling torque. A display supplied by this energizing current is provided for indicating the north direction. In the mentioned printed publications this display device consists of a servomotor by which the tape suspension is rotated until the energizing current becomes zero. Then, the spin axis is aligned with north such that the gyro directional torque is no longer effective. A telescope is connected to the tape suspension which is then aligned with north.

DE-OS 2 229 431 shows a tape-suspended meridian gyro in which the excursion of the gyro from a tape position of rest is also detected under the influence of the gyro directional torque by means of a pick-off and is converted to an electrical signal. Through an amplifier this signal controles a servomotor which rotates a telescope. A position pick-up is connected to the servomotor. Through an amplifier, the signal of the position pick-up determines the energizing current of a torquer acting about the tape axis on the gyro.

Finally, DE-AS 21 24 357 shows a meridian gyro apparatus having a gyro suspended by a tape in an intermediate housing. The pick-up generates a pick-off signal according to the excursion of the gyro from its tape zero position. The torquer exerts a counter-torque on the gyro, counteracting the gyro directional torque, with the pick-off signal again being supplied with a high gain to the torquer. The intermediate housing can be rotated by a servomotor. The pick-off signal is supplied to a memory. By means of a control circuit, after the adjustment of the gyro, the pick-off signal can be picked-off from the pick-off and can be supplied to the servomotor through a switching device. A feedback loop makes the angle of rotation of the servomotor proportional to the memorized pick-off signal.

The above mentioned meridian gyros allow the relatively quick determination of the north direction. The meridain gyros are arranged as free as possible from disturbances on a support which in turn, fixedly stands on the ground and is, as much as possible, shielded from vibrations. It is impossible to arrange such meridian gyros without any further measures in a disturbed environment, a vehicle, for example.

Therefore, filter arrangements have been provided by which the signal representing the "deviation from north", i.e. the energizing current of the torquer, is filtered.

DE-OS 25 45 026 shows a tape-suspended gyro with pick-off and torquer in which a signal proportional to the energizing current of the torquer is digitized by an analog-to-digital converter. The digital signal received with a fixed clock is supplied to a computer for forming recursive mean values. Each of the last recursively received mean values is directly output. A filtering is effected by forming the mean values. The recursive forming of this mean value ensures that a value for the deviation from north, even if it is quite an inaccurate value, is quickly present, and is corrected more and more in the course of time, the necessary memory capacity remaining within limits.

DE-OS 26 18 868 shows a similar arrangement. There, the mean value is formed from a fixed number of digital signals, i.e. the last N digital signals, with N being a fixed interger. This mean value is also recursively formed.

The generation of the mean values allows the averaging of white noise. However, in meridian gyros of the present type, in a disturbed enviroment, accelerations at the tape suspension cause relatively slowly increasing and again decreasing changes of the energizing current of the torquer which cannot be eliminated by forming the mean. On the contrary, the mean value is falsified by such disturbances.

From DE-PS 31 31 110 a gyro apparatus with a tape-suspended meridian gyro is known in which the gyro directional torque is compensated for by a counter-torque. The counter-torque is exerted by a torquer acting about the tape axis on the tape-suspended gyro housing. The torquer is supplied through an amplifier by a pick-off which responds to excursions of the gyro housing relative to a housing reference. In order to suppress disturbances which appear by a "rectifier effect" with oscillations of the apparatus housing, two acceleration detectors with their sensitivity axes perpendicular to each other are arranged at the apparatus housing. Signal processing means comprise a model for the disturbing dynamics according to which accelerations act as disturbances about the vertical axis. The signals of the accelerometer are supplied to this model. The model provides a disturbance signal whereby the measurement of the gyro directional torque is corrected.

In the meridian gyro according to DE-PS 31 31 100 the acceleration is measured at the tape suspension. This requires additional accelerometers. The received measuring value is corrected by a value which is obtained from a model only and represents the influence of the disturbance.

From DE-PS 31 31 111 a gyro apparatus for determining the north direction is known which also comprises a tape-suspended meridian gyro, a pick-off and a torquer similar to the above mentioned gyro apparatus. In order to suppress disturbances, a Kalman filter is provided which imitates the system of the restrained meridian gyro and, as the first filter input signal, obtains the difference from the signal supplied to the torquer (energizing current) and an estimate of this signal provided by the Kalman filter. As a second filter input signal, the Kalman filter additionally receives the difference of a signal representing the deviation of the meridian gyro from the housing reference and an estimate of this signal provided by the Kalman filter. Then, the estimate of the energizing current is output as a measure of the deviation of an apparatus reference from the north direction. Thereby, it shall be achieved that the estimate is quickly corrected to a "true" value and the disturbances are suppressed.

However, the Kalman filter provided in DE-PS 31 31 111 suppresses only stochastic disturbances but not disturbances of the above mentioned type which relatively slowly increase and then correspondingly slowly decrease again.

DISCLOSURE OF THE INVENTION

It is the object of the invention to provivde a filter arrangement for this and for similar cases in which a falsification of the output estimate by slowly increasing and decreasing disturbances is avoided.

According to the invention this object is achieved by means for achieving a measure of the disturbance and means for changing the weighting of the measuring signal in dependence on the measure of the disturbance.

The basic idea of the invention is the following: The measured variable shall be constant. As long as the measured variable remains substantially constant and is only superimposed by noise, the measured variable is heavily weighted with the filtering. By means of the filtering, the estimate of the measured variable is more and more corrected in the course of time. However, when a disturbance of the mentioned type occurs, less weight is attributed to the measured variable during the occurrence of the disturbance. In practice, the filter is switched off during the occurrence of the disturbance and the obtained estimate is memorized until the disturbance has again died down.

When the measured variable is the energizing current of a torquer by which a tape-suspended meridian gyro is restrained to a position of rest, a characteristic oscillation of the system formed by the restrained meridian gyro can serve as a measure of the disturbance. It has been found that, with relatively slowly increasing and decreasing disturbances of the described type, the system is energized to certain characteristic oscillations, particularly an oscillation about an axis perpendicular to the tape axis and the spin axis. Thus, this characteristic oscillation which is, in a particular meridian gyro, is 2 Hertz, for example, can serve as an indicator of the occurrence of disturbances.

Means for forming the variance of said characteristic oscillations can be provided. The variance of the characteristic oscillation can be supplied with delay to means for adaptive generation of a weighting quantity for the filter. According to a function empirically determined for the system in question, the weighting quantity can depend on the delayed variance of the characteristic oscillation.

The filter can be a Kalman filter with a state estimator and means for representing a co-variance equation, the means for representing the co-variance equation being controlled by the weighting quantity.

A pre-filter which comprises a mean value filter and an integrating stage can be connected upstream to the Kalman filter.

The co-variances from the means for illustrating the co-variance equation and the weighting quantity can be supplied to means for evaluating the filter quality, which terminate the filtering when a predetermined filter quality is achieved and effect the output of an estimate of the energizing current of the torquer.

Embodiments of the invention will now be described in further detail with reference to the accompanying drawings.

PREFERRED EMBODIMENT OF THE INVENTION

Figure 1:
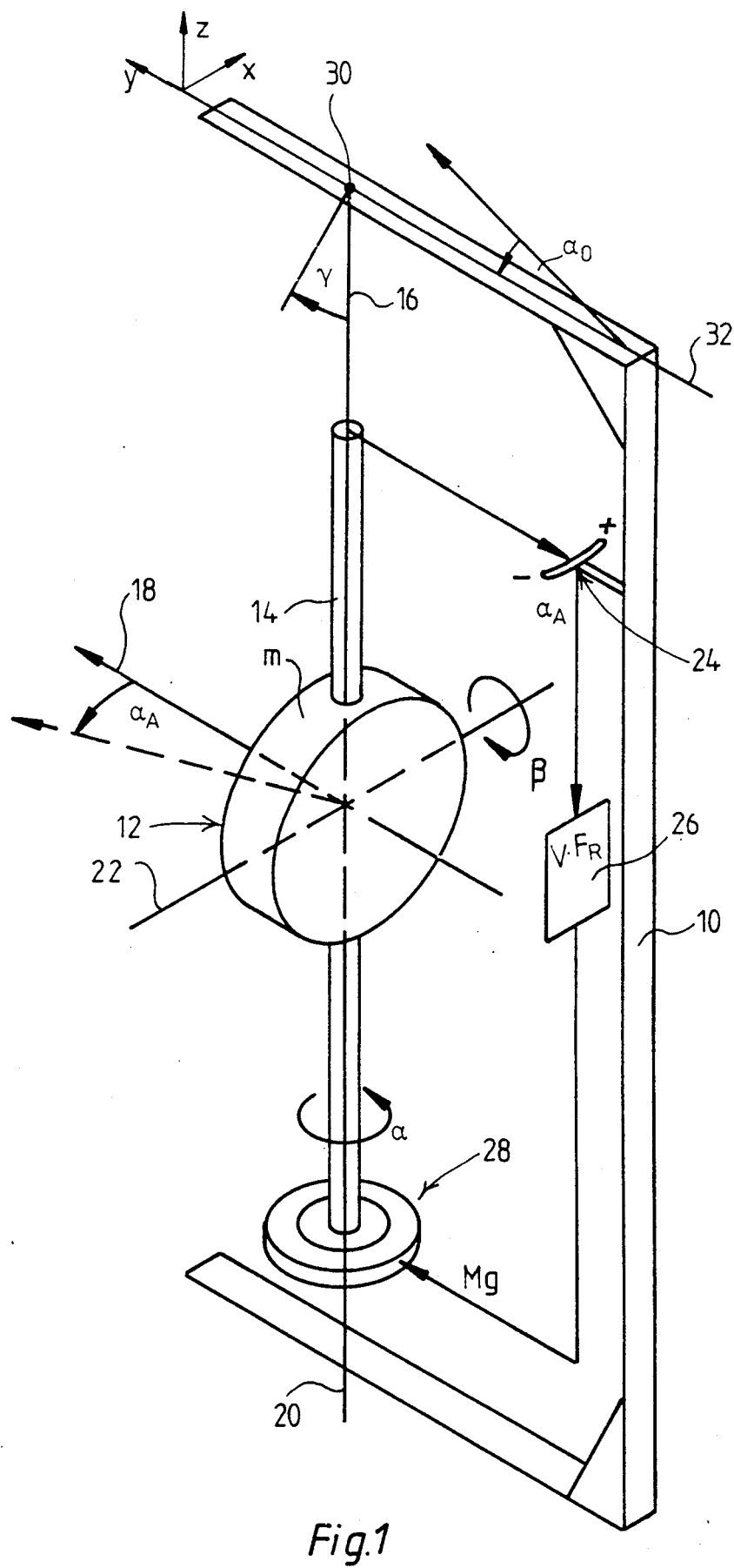
FIG. 1 is a schematic perspective illustration of a tape-suspended gyro.

In FIG. 1, a housing 10 is schematically indicated. In the housing 12, a gyro 12 with a mast 14 is suspended at a tape 16. Numeral 18 designates the spin axis of the gyro 12. At rest, the spin axis extends horizontal and perpendicular to the vertical tape axis 20. A transverse axis 22 extends perpendicular to the spin axis 18 and to the tape axis 20. In FIG. 1, the spin axis 18 is illustrated in the tape zero position, i.e. in a position in which the tape 16 is not rotated. An excursion of the gyro 12 about the tape axis 20 from this tape zero position, as indicated in FIG. 1 by broken lines, is detected by the pick-off 24. The angle of the excursion is designated by $\alpha_A$. The pick-off 24 generates an electrical pick-off signal. This pick-off signal is amplified by an amplifier 26 and generates an energizing current which is supplied to a torquer 28. The rotor of the torquer 28 is connected to a gyro.

Due to the earth rotation, a gyro directional torque acts on the gyro 12 and endeavors to align the spin axis of the gyro with north. The torque of the torquer 28 counteracts this gyro directional torque. When the gyro 12 is moved under the influence of the gyro directional torque out of the tape zero-position, a signal is generated at the pick-off 24 which counteracts this excursion through the torquer 28. Therefore, the gyro is electrically restrained to the tape zero-position (or, in more general terms: to a housing-fixed reference position).

Besides the movement about the tape axis 20, the gyro can also move about the transverse axis 22. The angle of rotation about the transverse axis 22 is designated by $\beta$. Finally, as indicated in FIG. 1, there is also a movement possible about the axis 32 which is parallel to the spin axis and extends through the suspension point 30 of the tape 16. The angle of rotation about this axis 32 is designated by $\gamma$.

Figure 2:
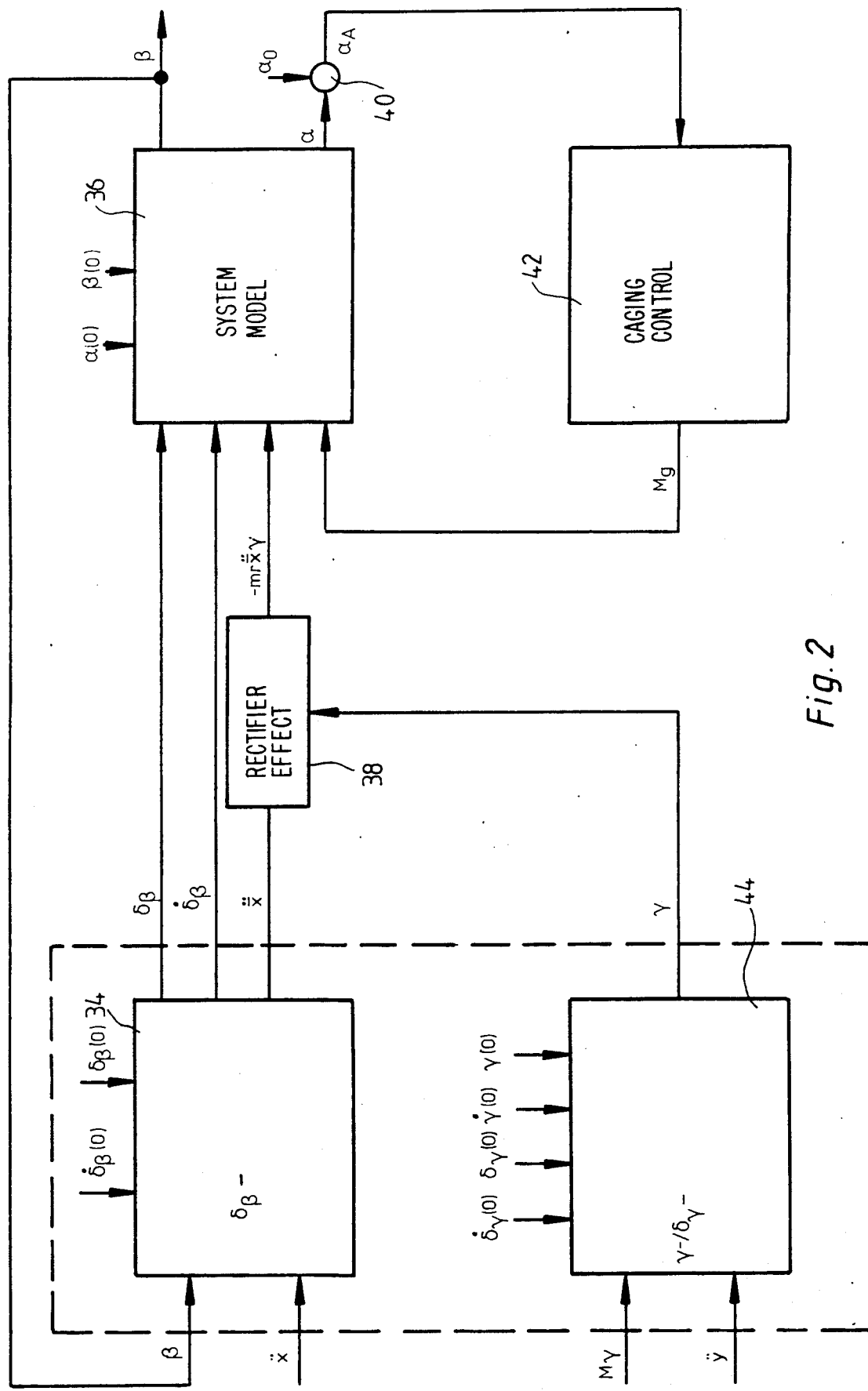
FIG. 2 shows by a block-diagram the model structure of the tape-suspended meridian gyro.

This tape-suspended, restrained gyro is an oscillatory system with certain characteristic oscillations. In FIG. 2, a model of this system is illustrated by a block-diagram.

The tape-suspended gyro undergoes disturbances in the form of accelerations $\ddot{x}$ and $\ddot{y}$ at the suspension point 30 (FIG. 1). Further, torques $M_\gamma$ about the axis 32 can act on the gyro 12. Accelerations in the x-direction excite a characteristic oscillation about the transverse axis 22 which is designated by $\delta_\beta$. This oscillation is illustrated by the block 34. $\delta_\beta(O)$ and $\dot{\delta}_\beta(O)$ are the initial conditions of these characteristic oscillations. The oscillation conditions $\delta_\beta$ and $\dot{\delta}_\beta$ result which become effective at the gyro 12 illustrated in the model as block 36. In addition, an acceleration $\ddot{x}$ results which is modified by the oscillation. This oscillation together with the angle $\gamma$ provide a "rectifier effect" which is illustrated by the block 38. Therefore, a torque -mrx$\gamma$ acts on the gyro 12 (block 36).

The gyro 36 makes a movement $\alpha$ about the tape axis 20 and movement $\beta$ about the transverse axis 22. The angle between the housing reference and the north is $\alpha_o$. The difference between the angle $\alpha$ and the angle $\alpha_o$, which is formed in the model in the summing point 40, provides the angle $\alpha_A$, i.e. the excursion relative to the housing reference. This is the angle which is detected by the pick-off 24 and is supplied as a signal to the amplifier 26 and to the torquer 28 which are illustrated in FIG. 2 by a block 42 as "caging control". The caging control 42 provides a torque $M_g$ which becomes effective at the gyro 12 and is supplied to the block 36 in FIG. 2. Furthermore, the block receives the starting values of the two angles $\alpha(O)$ and $\beta(O)$.

In FIG. 2, a block 44 symbolizes the oscillation about the axis 32 and, in particular, the characteristic oscillation about this axis 32 designated by $\delta_\gamma$. The disturbances $M_\gamma$ and y act on the block 44, the initial values of the oscillations are described by $\delta_\gamma(\hat{O})$, $\delta_\gamma(O)$, $\gamma(O)$ and $\dot{\gamma}(O)$.

As already mentioned, the described system has characteristic oscillations about the transverse axis 22 and the axis 32. These characteristic oscillations are energized by disturbances in the form of translatory accelerations in the suspension point 30. It was found that, with the occurrence of disturbances which cause a relatively slowly increasing and decreasing difference in the energizing current of the torquer 28 from the constant value, these characteristic oscillations are excited. This is particularly true for the $\delta_\beta$—oscillation about the transverse axis 22. Therefore, the amplitude of this characteristic oscillation is a good measure of the disturbance dynamics.

Figure 3:
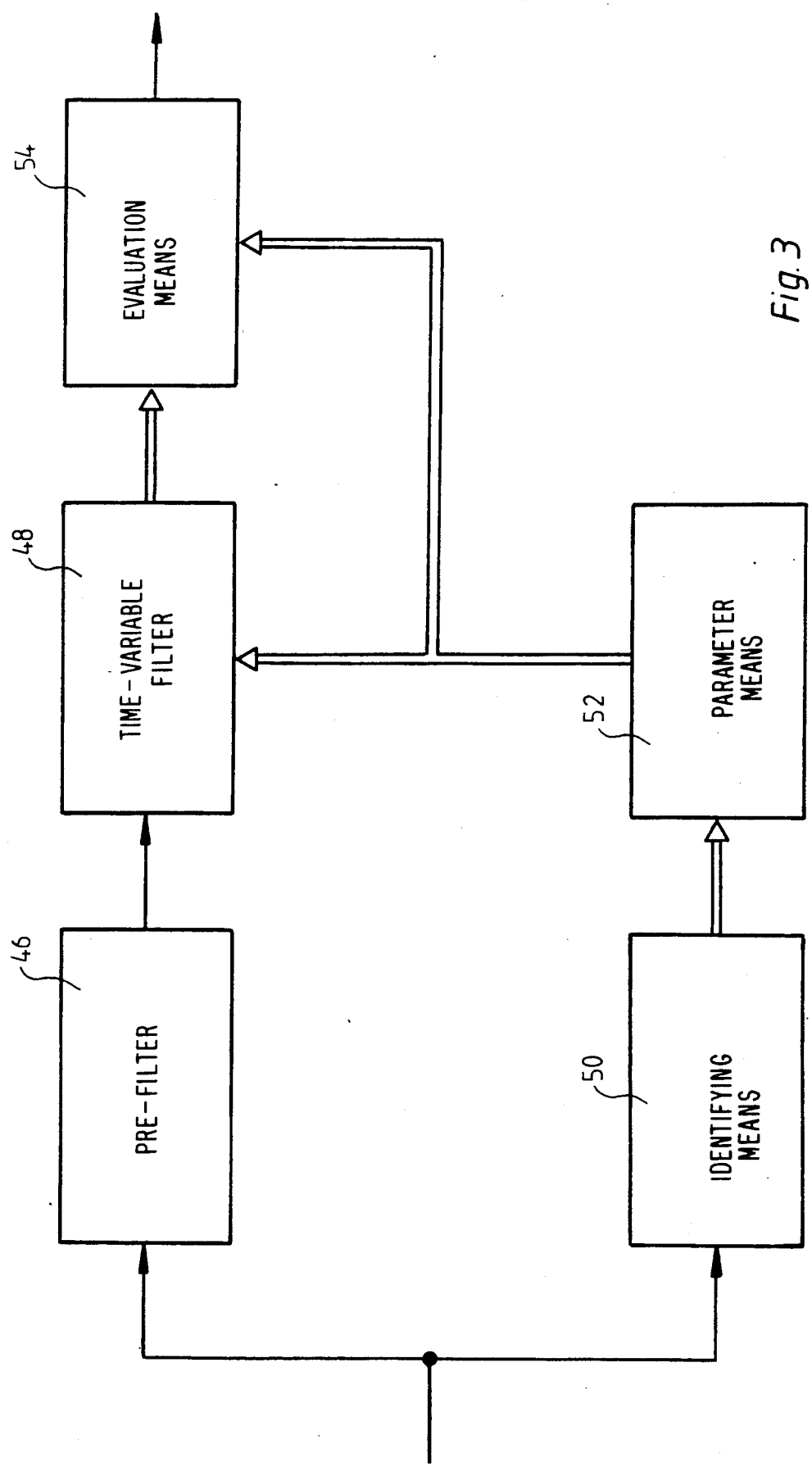
FIG. 3 shows by a block-diagram the structure of an adaptive filter for compensating for disturbances.

FIG. 3 is a block diagram and shows the structure of a filter arrangement which can identify disturbances and prevent them.

A measured variable, here the energizing current of the torquer 28, is scanned and digitized and is supplied as the input value $M_g(k)$ to the filter arrangement, with k being a running integer and designating the clock. This input value is supplied through a pre-filter 46 to a time-variable filter 48 and, on the other hand, is supplied to identifying means 50 for identifying a disturbance. The identifying means 50 influence parameter means 52 which adaptingly generate controlling parameters for the time-variable filter. The time-variable filter 48 and the parameter means 52 are designed such that with the identification of a disturbance by the identification means 50, the occurring input values in the filter 48 which are filtered by the pre-filter are not considered or are considered with less weight. In the case that a disturbance occurs which exceeds a certain measure and therefore would cause a deterioration of the estimates obtained up to the present, the input values occuring during the occurrence of the disturbance are not considered. The estimate obtained up to the present is maintained. After the disturbance subsides, starting from the maintained estimate, a further filtering for further correction of the estimate is conducted.

The controlling parameters of the parameter means 52 are simultaneously used for the determination of the quality of the filtering result. Therefore, the controlling parameters are supplied to evaluation means 54 by which an evaluation of the quality of the filtering result is effected. The evaluation means terminate the filtering and the estimate $M_g$ is output when a predetermined quality of the filtering result is achieved.

Figure 4:
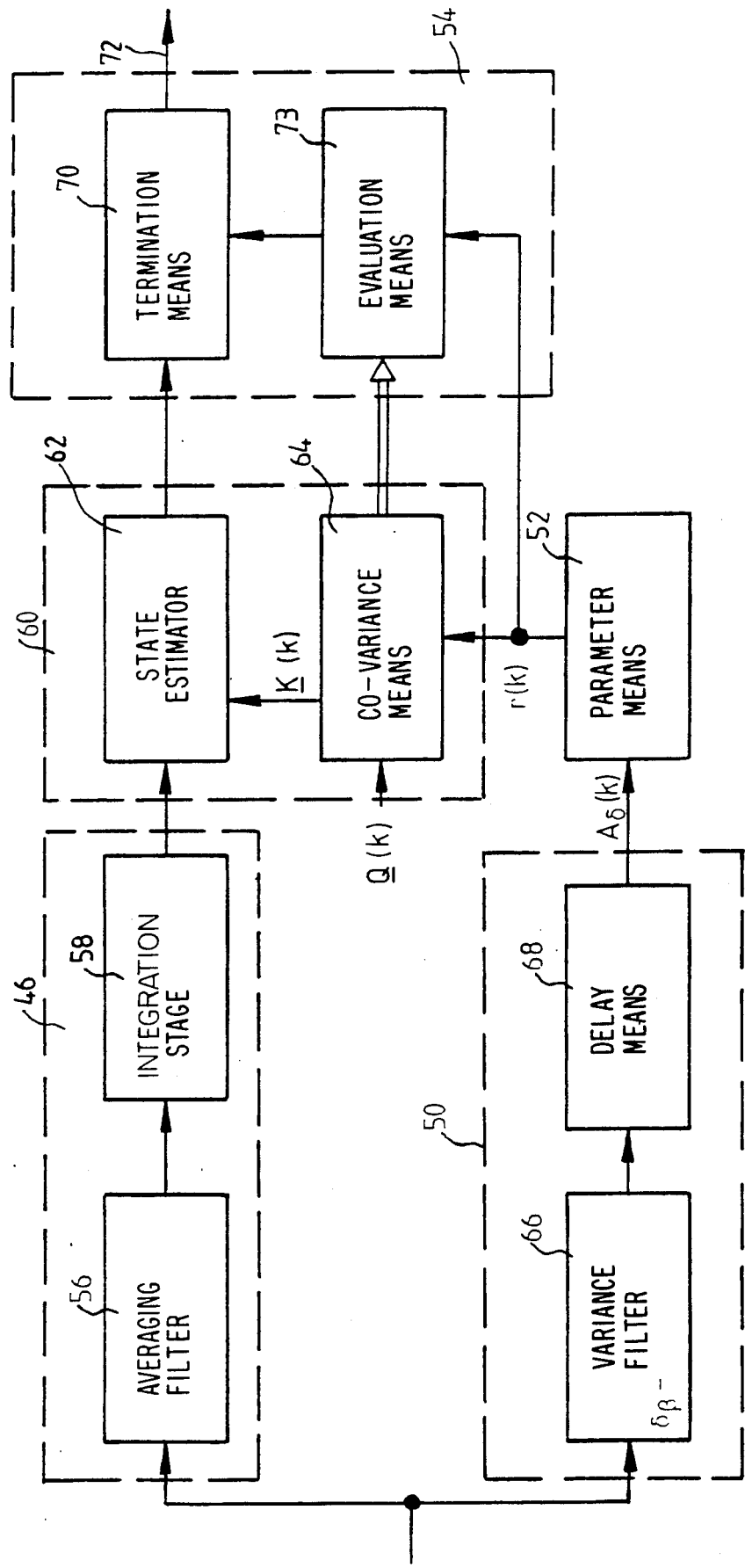
FIG. 4 shows the basic form of a time-saving realization of the filter.

FIG. 4 shows the application of this principle on the filtering of output signals, i.e. the energizing current of the torquer 28 in a tape-suspended meridian gyro according to FIG. 1. The time-saving form of realization described now is based on a Kalman filter of an order as low as possible.

The pre-filter 46 comprises averaging filter 56 matched with the dominant characteristic frequency of the meridian gyro and an integration stage 58 connected downstream therefore. The output of the integration stage 58 is supplied to a Kalman filter 60. The Kalman filter 60 comprises a state estimator 62 of second order and co-variance means 64 for representing the co-variance equation of third order. The co-variance means 64 provide the time-variable coefficients $K_1(k)$ and $K_2(k)$ for the state estimator. The state estimator 62 provides an estimate $\hat{M}_g(k)$ of the energizing current of the torquer 28.

The Kalman filter is of the type described in the patent application "Filter for Achieving a Time-Invariant Useful Signal from Noisy Measurements" Ser. No. 424,534 filed on Oct. 20, 1989 by Uwe Krogmann.

Furthermore, the input value is supplied to the identification means 50. In the preferred embodiment according to FIG. 4, the identification means 50 comprise a variance filter 66 for the "$\delta_\beta$—oscillation", i.e. the characteristic oscillation of the system about the transverse axis 22. The variance filter 66 forms the variance of this oscillation of the measuring signal, i.e. the sum of the squared difference from the mean value. The filter length is matched such that the variance is a measure of the amplitude square of the $\delta_\beta$—oscillation. Thus, the variance filter provides a value which represents a measure of the $\delta_\beta$—oscillation. According to the model, this oscillation in turn is a measure of the occuring disturbances. The output signal of the variance filter $A_\delta(k)$ is supplied to the parameter means with a delay, as is illustrated by block 68.

The parameter means 52 provide a weighting value r(k) according to a function of the delayed variance $A_\delta(k)$ which is empirically determined for a particular meridian gyro. The larger the variance is, the smaller the weighting value r(k).

The weighting value r(k) is applied to the co-variance means 64 and determines the time-variant filter parameter of the matrix P(k). The filter parameter P(k) in turn determines the coeficients $K_1(k)$ and $K_2(k)$ of the state estimator 62.

The state estimator 62 provides an estimate $\hat{M}_g(k)$ of the measured variable, here the energizing current of the torquer 28. This estimate of the constant measurable variable becomes, as long as no disturbances occur, better and better over the measuring period of time. The evaluation of the weighting value r(k) causes input values which occur during such disturbances not to be considered for the estimate in the Kalman filter or to be only considered with less weight.

The weighting value r(k) and the filter parameter P(k) provide a measure of the quality of the estimate. Therefore, these values are supplied to the evaluation means 73. These evaluation means 73 decide whether the damanded quality of the filtering is achieved and effect, through termination means 70, cause termination of the filtering and the output of the estimate $\hat{M}_g$ at the output 72.

Figure 5:
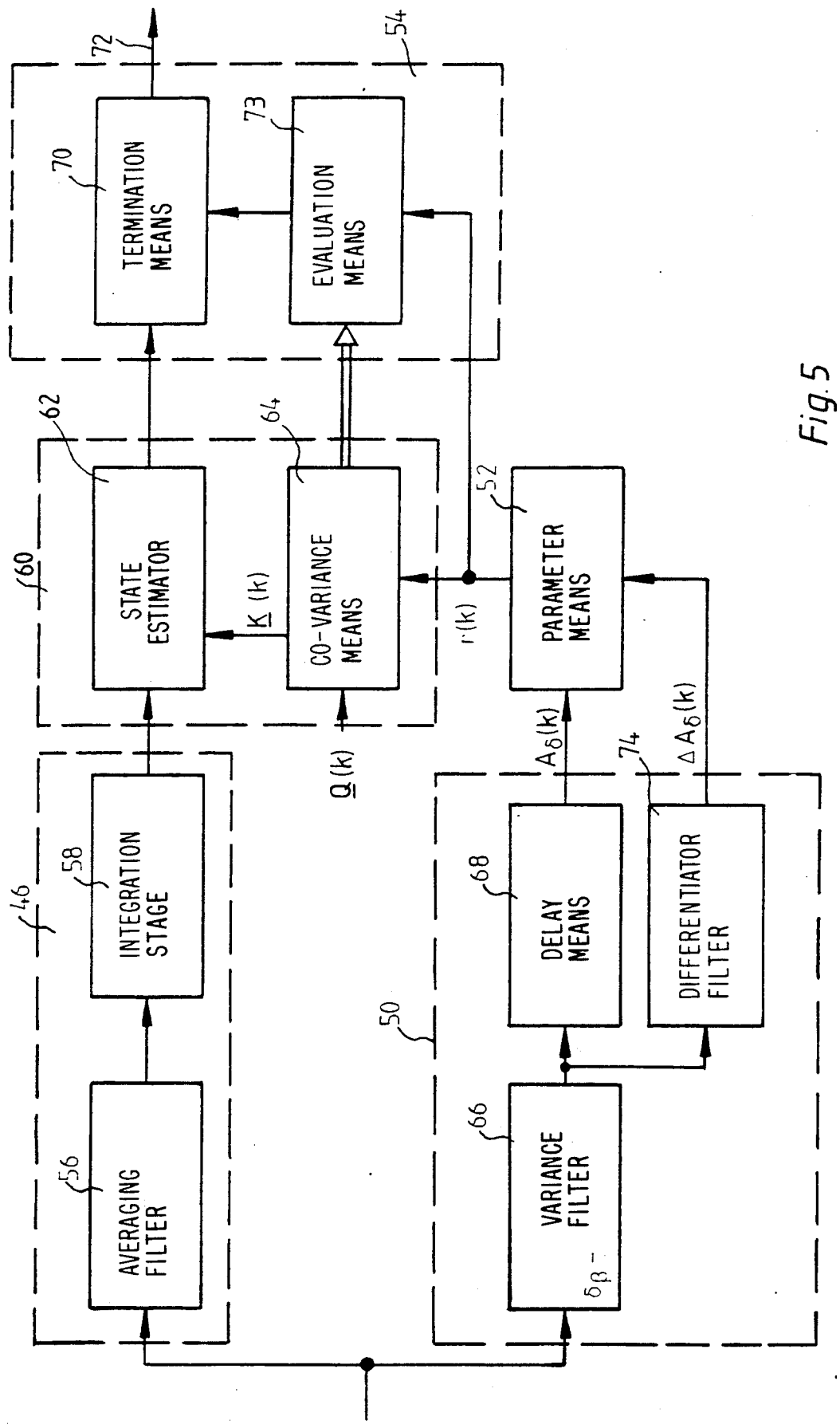
FIG. 5 shows a modification of the filter of FIG. 4.

With the embodiment of FIG. 5, the basic structure of the filter arrangement is identical with that of FIG. 4. Corresponding elements are provided with the same numerals. In the filter arrangement of FIG. 5, the variance of the $\delta_\beta$—oscillation is is not only directly supplied by the variance filter 66 with a delay according to block 68 to the parameter means 52 but is also supplied through a differentiator filter 74 as $\Delta A\delta$ (k). Thus, not only the amplitude of the $\delta_\beta$—oscillation is considered but also the change of this amplitude.

Figure 6:
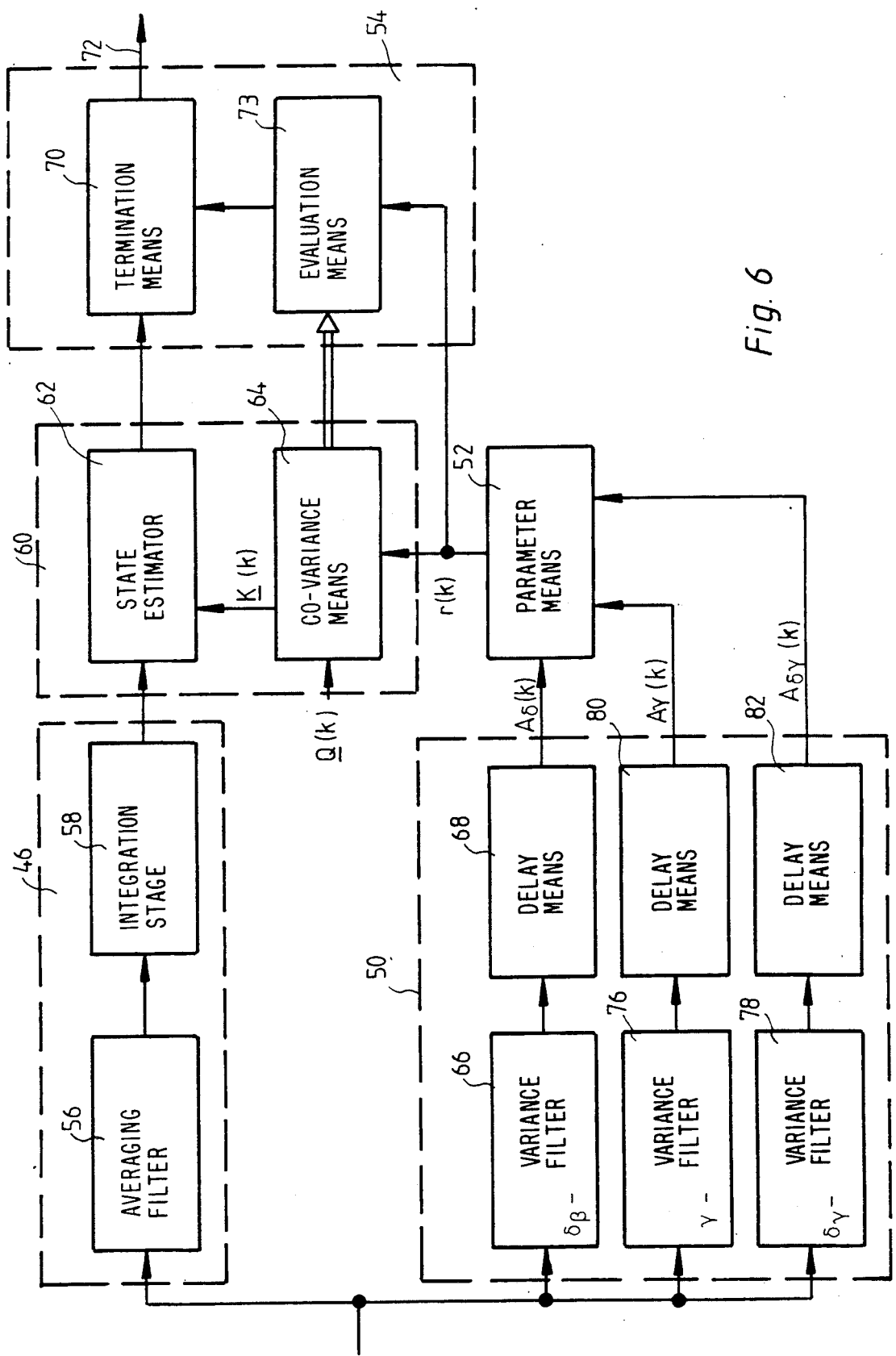
FIG. 6 is a further modification of the filter of FIGS. 4 or 5.

Also in the modification according to FIG. 6, the basic structure of the filter arrangement is identical with that of FIG. 4. Corresponding elements are designated in FIG. 6 by the same numerals as in FIG. 4, In the filter arrangement according to FIG. 6 not only the $\delta_\beta$—oscillation is used as indicators for the occurrence of a disturbance but also the other characteristic oscillations of the system and its harmonic waves. Corrsepondingly, a variance filter 76 for the $\gamma$—oscillation and a variance filter 78 for the $\delta_\gamma$—oscillation are provided in addition to the variance filter 66 for the $\delta_\beta$—oscillation. The variances $A_\gamma(k)$ and $A\delta_\gamma(k)$, respectively, are supplied to the parameter means with delay, illustrated by the blocks 80 and 82, respectively.

We claims;

1. Filter arrangement for generating an estimate of a measured variable influenced by disturbances by means of a filter effecting a weighting of measuring signals comprising means (50) for achieving a measure of the disturbance and means (52) for changing the weighting of the measuring signal in dependence on the measure of the disturbance.

2. Filter arrangement as set forth in claim 1, wherein the filter is a Kalman filter (60).

3. Filter arrangement as set forth in claim 2, wherein
   (a) the measured variable is the energizing current of a torquer (28) whereby a tape-suspended meridian gyro (12) is restrained to a position of rest, and
   (b) a characteristic oscillation of the system formed by the restrained meridian gyro (12) serves as the measure for the disturbance.

4. Filter arrangement as set forth in claim 3, including means (66) for generating the variance of said characteristic oscillation.

5. Filter arrangement as set forth in claim 4, wherein the characteristic oscillation used as a measure for the disturbance is an oscillation about a transverse axis (22) perpendicular to the tape axis (20) and the spin axis (18).

6. Filter arrangement as set forth in claim 4, wherein the variance of the characteristic oscillation is supplied with delay to the means (52) for adaptive generation of a weighting quantity (r(k)) for the filter (60).

7. Filter arrangement as set forth in claim 6, wherein the weighting quantity (r(k)), according to an empirically determined function for the system in question, depends on the delayed variance $A_\delta(k)$ of the characteristic oscillation.

8. Filter arrangement as set forth in claim 7, wherein
   (a) the filter is a Kalman filter (60) with a state estimator (62) and means (64) for illustrating a co-variance equation, and
   (b) the means (64) for illustrating the co-variance equation are controlled by the weighting quality (r(k)).

9. Filter arrangement as set forth in claim 8, wherein the energizing current of the torquer (28) is supplied through a pre-filter (46) comprising a mean value filter (56) and an integrating stage (58) connected downstream.

10. Filter arrangement as set forth in claim 8, wherein the co-variances from the means (64) for illustrating the co-variance equation and the weighting quantity (r(k)) are supplied to means (73) for weighting the filter quality, which means effect a termination of the filtering (70) when a predetermined filter quality is achieved and effect the output of an estimate (72) of the energizing current of the torquer (28).

* * * * *